(12) United States Patent
Balsillie

(10) Patent No.: US 8,244,217 B2
(45) Date of Patent: Aug. 14, 2012

(54) SYSTEM AND METHOD OF AUTHENTICATING LOGIN CREDENTIALS IN A WIRELESS COMMUNICATION SYSTEM

(75) Inventor: Jim Balsillie, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/198,052

(22) Filed: Aug. 4, 2011

(65) Prior Publication Data

US 2011/0287744 A1 Nov. 24, 2011

Related U.S. Application Data

(63) Continuation of application No. 11/305,272, filed on Dec. 16, 2005, now Pat. No. 8,005,459.

(51) Int. Cl.
 *H04M 1/66* (2006.01)
(52) U.S. Cl. ........................................ 455/411; 455/410
(58) Field of Classification Search ........... 455/410–411
See application file for complete search history.

(56) References Cited

U.S. PATENT DOCUMENTS

| | | | |
|---|---|---|---|
| 5,963,884 A | 10/1999 | Billington et al. | |
| 5,987,331 A | 11/1999 | Grube et al. | |
| 6,105,140 A | 8/2000 | Crisan | |
| 6,131,096 A | 10/2000 | Ng et al. | |
| 6,134,432 A | 10/2000 | Holmes et al. | |
| 6,477,150 B1 | 11/2002 | Maggenti et al. | |
| 6,834,182 B2 | 12/2004 | Fu | |
| 6,839,741 B1 | 1/2005 | Tsai | |
| 7,127,236 B2 | 10/2006 | Khan et al. | |
| 7,151,932 B2 | 12/2006 | Major | |

(Continued)

FOREIGN PATENT DOCUMENTS

EP 1494429 A2 1/2005

(Continued)

OTHER PUBLICATIONS

Provisioning Bootstrap Version Mar. 14, 2001, Wireless Application Protocol WAP-182-ProvArch-20010314-a, Wireless Application Protocol Forum Ltd.

(Continued)

*Primary Examiner* — Steven Lim
(74) *Attorney, Agent, or Firm* — John J. Oskorep, Esq.

(57) ABSTRACT

A technique in a wireless mobile device for use in enabling service sessions with a host service via a wireless network is described. The device receives a host login credential from the host service, and saves it in memory. The device detects a logoff trigger for logging off from an enabled service session with the host service. In response to detecting the logoff trigger, the device performing the following actions. The device prompts with, in a display, an entry screen having a field for entry of a device login credential for use in logging on to a subsequent service session with the host service. The device receives, via a user I/O subsystem, the device login credential in response to the prompting, and saves it in memory. After receiving and saving the device login credential, the device logs off from the enabled service session with the host service. After the logging off from the enabled service session, the device detects a login trigger for logging on to the subsequent service session with the host service. In response to detecting the login trigger, the device authenticates the saved device login credential with the saved host login credential.

20 Claims, 7 Drawing Sheets

U.S. PATENT DOCUMENTS

| | | |
|---|---|---|
| 7,424,302 B2 | 9/2008 | Carpenter |
| 2002/0038333 A1 | 3/2002 | Evans et al. |
| 2002/0087479 A1 | 7/2002 | Malcolm |
| 2002/0138582 A1 | 9/2002 | Chandra et al. |
| 2002/0184217 A1 | 12/2002 | Bisbee et al. |
| 2003/0036398 A1 | 2/2003 | Asakawa |
| 2003/0204734 A1 | 10/2003 | Wheeler |
| 2004/0064707 A1 | 4/2004 | McCann et al. |
| 2004/0078597 A1 | 4/2004 | Sun et al. |
| 2004/0087300 A1 | 5/2004 | Lewis |
| 2004/0111620 A1 | 6/2004 | Saunders et al. |
| 2004/0185874 A1* | 9/2004 | Kim et al. ............... 455/456.3 |
| 2004/0242229 A1 | 12/2004 | Okazaki |
| 2004/0268148 A1 | 12/2004 | Karjala et al. |
| 2005/0038994 A1 | 2/2005 | Johnson et al. |
| 2005/0144485 A1 | 6/2005 | Mousseau |
| 2006/0002556 A1 | 1/2006 | Paul |
| 2006/0052134 A1 | 3/2006 | Sato |
| 2006/0073788 A1 | 4/2006 | Halkka et al. |
| 2006/0075242 A1 | 4/2006 | Aissi et al. |
| 2006/0218408 A1 | 9/2006 | Serpa |
| 2006/0224750 A1 | 10/2006 | Davies et al. |
| 2006/0265340 A1 | 11/2006 | Ziv et al. |
| 2007/0043681 A1 | 2/2007 | Morgan et al. |
| 2007/0050840 A1 | 3/2007 | Grandcolas et al. |
| 2007/0106739 A1 | 5/2007 | Clark et al. |
| 2007/0150723 A1 | 6/2007 | Estable et al. |
| 2008/0009345 A1 | 1/2008 | Bailey et al. |
| 2008/0162499 A1 | 7/2008 | Connor et al. |
| 2008/0178273 A1 | 7/2008 | Weber |

FOREIGN PATENT DOCUMENTS

| | | |
|---|---|---|
| EP | 1933252 A1 | 6/2008 |
| WO | 2003107710 A1 | 12/2003 |

OTHER PUBLICATIONS

Push-To-Talk Over Cellular (PoC); Architecture; PoC Release 2.0; Technical Specification, Architecture V2.0.8, Jun. 2004.

S/MIME Support Package, Release 4.0, White Paper, 2005, Research in Motion Limited.

BlackBerry Security, White Paper, Release 4.0, 2005, Research in Motion Limited.

Wireless LAN (WLAN) End to End Guidelines for Enterprises and Public Hotspot Service Providers, Intel Communications, Release 1.1, Nov. 2003.

Step-By-Step Guide to Deploying Microsoft Exchange Server 2003 SP2 Mobile Messaging With Windows Mobile 5.0-Based Devices, Windows Mobile, Mar. 2006.

Blackberry Enterprise Server Version 3.6 for Microsoft Exchange, 2003, Research in Motion Limited.

J. Myers et al, "Post Office Protocol—Version 3", May 1996, pp. 1-25, vol. 3.

Provisioning Architecture Overview Version Mar. 14, 2001, Wireless Application Protocol WAP-182-ProvArch-20010314-a, Wireless Application Protocol Forum Ltd.

* cited by examiner

SYSTEM AND METHOD OF AUTHENTICATING LOGIN CREDENTIALS IN A WIRELESS COMMUNICATION SYSTEM

CROSS REFERENCE TO RELATED APPLICATION

This patent application claims priority to and is a continuation of U.S. non-provisional patent application having application Ser. No. 11/305,272 and filing date of 16 Dec. 2005, now U.S. Pat. No. 8,005,459, which is hereby incorporated by reference herein.

FIELD OF THE INVENTION

The present invention generally relates to a wireless communication system, and more specifically to a session authentication using login credentials.

BACKGROUND OF THE INVENTION

In a wireless communication system designed to deliver data to a wireless mobile communication device ("mobile device") such as a cellular telephone, a two-way pager, a wireless communication capable personal digital assistant ("PDA"), and other similar device, there are several main components in the wireless communication system. A host service, which provides services such as e-mail, calendar, and Internet web browsing, holds the data to be delivered to the mobile device. The host service is coupled to a router, which couples the host service and a wireless network that is designed to communicate with the mobile device. To make a timely delivery of the data, the host service forwards the data for the mobile device to the router when the data becomes available. The router then forwards the data to the wireless network, which transmits the data to the mobile device. If the mobile device fails to receive the data, the router or host service queues the data and re-forwards the data to the wireless network, which re-transmits the data to the mobile device. This process continues until the mobile device receives the data and acknowledges the reception or the process times out after a predetermined time period.

A user of the mobile device is effectively logged onto a wireless service session when the host service and mobile device can establish a communication link by authenticating the logon credentials entered by the user. A session is deemed enabled active when the host service can authenticate the login and password entered. Thereafter, the device and host service can send and receive messages across the established wireless link.

The user typically logs onto a service session by entering a login and password at the beginning of the session (e.g, when user decides to start using the device and/or service provided by the host service). In some instances, this logon sequence (i.e., enter login/password, send to host service, authenticate with host service, establish connection) may be delayed, due to such scenarios as network congestion or traffic. This may negatively impact the user's perception of the service or device to be slow and/or unreliable.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which.

DETAILED DESCRIPTION OF THE PREFERRED EMBODIMENTS

Figure 1:
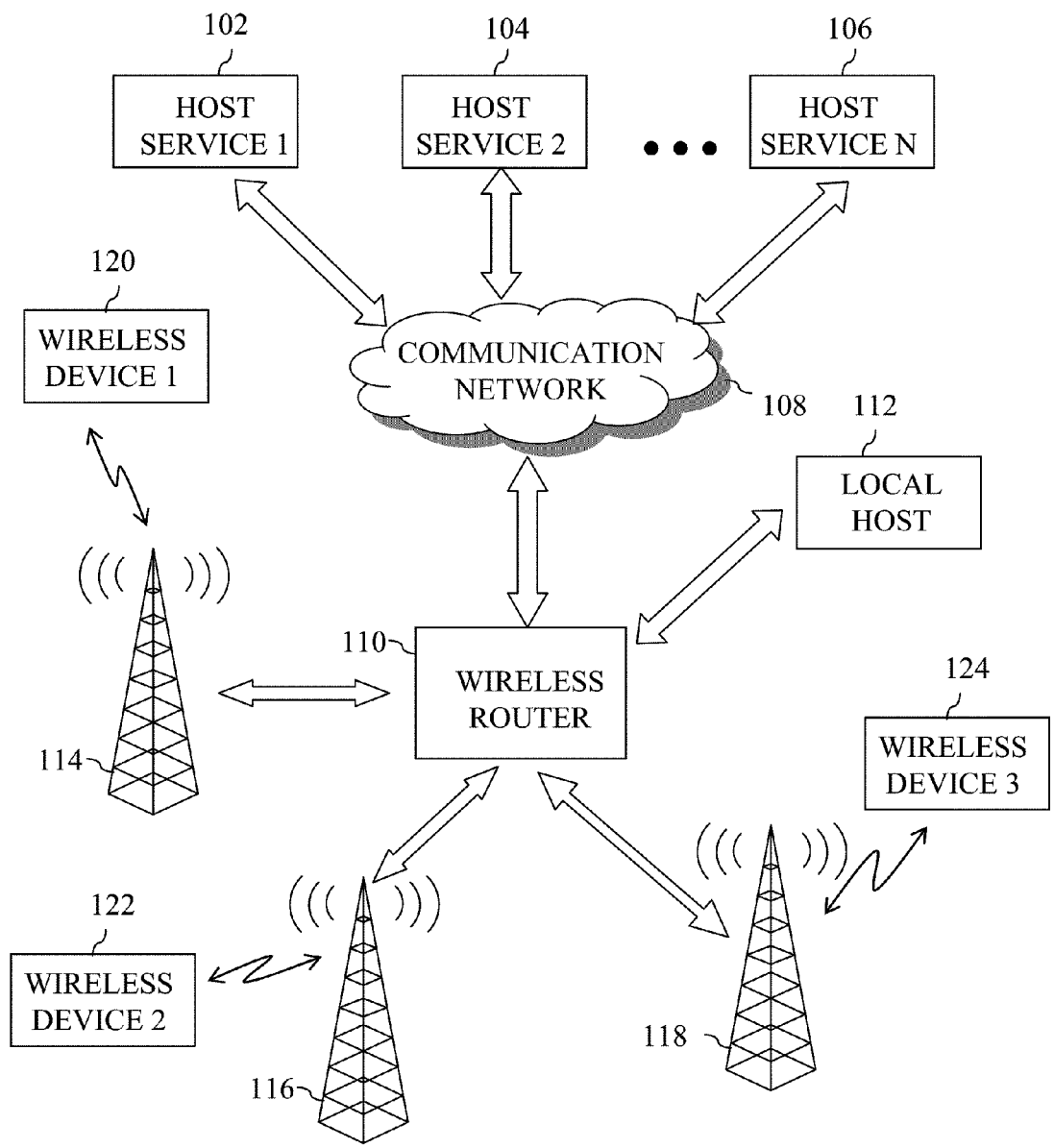
FIG. 1 is an exemplary environment in which a wireless communication system in accordance with at least one of the preferred embodiments may be practiced.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein Examples of applicable communication devices include pagers, cellular phones, cellular smart-phones, wireless organizers, personal digital assistants, computers, laptops, handheld wireless communication devices, wirelessly enabled notebook computers and the like, each of which is capable of sending messages to one or more recipients.

A wireless communication system, comprising a host service, a wireless router system coupled to the host service, a wireless network coupling the wireless router system and a wireless mobile communication device ("mobile device"), adaptively delivers data to and from the mobile device in the wireless communication system. To access or use a service provided by the host service, a user of the mobile device must log onto a service session with the host service by entering a login and password at the beginning of the session (e.g, when user decides to start using the device and/or service provided by the host service) so that the mobile device and host service can establish a communication link by authenticating the logon credentials entered by the user. During an active session, the device and host service can send and receive messages across the established wireless link.

Before logging off a session on the mobile device, the user is prompted for login credentials (login/password). These login credentials may be stored locally on the mobile device or at the host service. According to an embodiment, the login credentials are used to authenticate the device for the next device session. As will be explained below in further detail, upon sensing the next login trigger, service can be immediately restored at the device (i.e., user logged onto session) without further authentication being necessary.

FIG. 1 is an exemplary wireless communication system 100 in which a wireless communication system in accordance with at least one of the preferred embodiments may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. The host services 102, 104, and 106 are connected to a communication network 108 such as Internet, which connects to a wireless router system 110 allowing communication between the host services 102, 104, and 106 and the wireless router 110. The wireless router system 110 may also be connected to a host service, such as a local service 112, without the communication network 108. The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, a two-way paging network, a short range wireless network such as Bluetooth™ and IEEE 802.11 compliant network, and others alike, and the mobile devices 120, 122, and 124 are device compatible with the corresponding wireless network.

Mobile devices 120, 122 and 124 are two-way communication devices with advanced data communication capabilities having the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
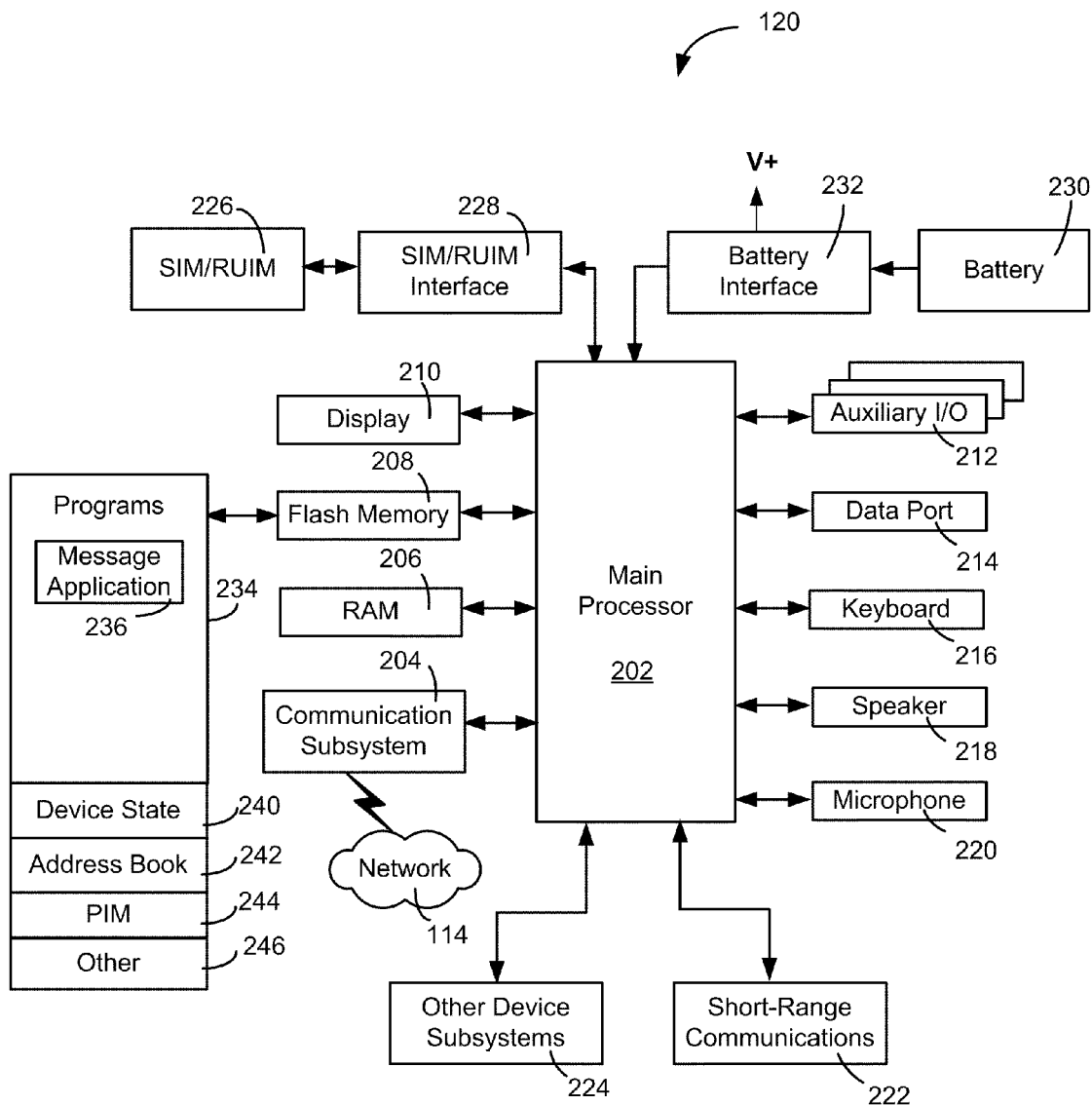
FIG. 2 is an exemplary block diagram of a preferred embodiment of a mobile communication device.

Referring to FIG. 2, shown therein is a block diagram of a mobile device 120 in one exemplary implementation. The mobile device 120 comprises a number of components, the controlling component being a main processor 202 which controls the overall operation of mobile device 120. Communication functions, including data and voice communications, are performed through a communication subsystem 204. The communication subsystem 204 receives messages from and sends messages to a wireless network 114. In this exemplary implementation of the mobile device 120, the communication subsystem 204 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 204 with the wireless network 114 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 114 associated with mobile device 120 is a GSM/GPRS wireless network in one exemplary implementation, other wireless networks may also be associated with the mobile device 120 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 202 also interacts with additional subsystems such as a Random Access Memory (RAM) 206, a flash memory 208, a display 210, an auxiliary input/output (I/O) subsystem 212, a data port 214, a keyboard 216, a speaker 218, a microphone 220, short-range communications 222 and other device subsystems 224.

Some of the subsystems of the mobile device 120 perform communication-related functions, whereas other subsystems may provide "resident" or on-device functions. By way of example, the display 210 and the keyboard 216 may be used for both communication-related functions, such as entering a text message for transmission over the network 114, and device-resident functions such as a calculator or task list. Operating system software used by the main processor 202 is typically stored in a persistent store such as the flash memory 208, which may alternatively be a read-only memory (ROM) or similar storage element (not shown). Those skilled in the art will appreciate that the operating system, specific device applications, or parts thereof, may be temporarily loaded into a volatile store such as the RAM 206.

The mobile device 120 may send and receive communication signals over the wireless network 114 after required network registration or activation procedures have been completed. Network access is associated with a subscriber or user of the mobile device 120. To identify a subscriber, the mobile device 120 requires a SIM/RUIM card 226 (i.e. Subscriber Identity Module or a Removable User Identity Module) to be inserted into a SIM/RUIM interface 228 in order to communicate with a network. The SIM card or RUIM 226 is one type of a conventional "smart card" that can be used to identify a subscriber of the mobile device 120 and to personalize the mobile device 120, among other things. Without the SIM card 226, the mobile device 120 is not fully operational for communication with the wireless network 114. By inserting the SIM card/RUIM 226 into the SIM/RUIM interface 228, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 226 includes a processor and memory for storing information. Once the SIM card/RUIM 226 is inserted into the SIM/RUIM interface 228, it is coupled to the main processor 202. In order to identify the subscriber, the SIM card/RUIM 226 contains some user parameters such as an International Mobile Subscriber Identity (IMSI). An advantage of using the SIM card/RUIM 226 is that a subscriber is not necessarily bound by any single physical mobile device. The SIM card/RUIM 226 may store additional subscriber information for a mobile device as well, including date book (or calendar) information and recent call information. Alternatively, user identification information can also be programmed into the flash memory 208.

The mobile device 120 is a battery-powered device and includes a battery interface 232 for receiving one or more rechargeable batteries 130. In some embodiments, the battery 230 may be a smart battery with an embedded microprocessor. The battery interface 232 is coupled to a regulator (not shown), which assists the battery 230 in providing power V+ to the mobile device 120.

The main processor 202, in addition to its operating system functions, enables execution of software applications 234 on the mobile device 120. The subset of software applications 234 that control basic device operations, including data and voice communication applications, will normally be installed on the mobile device 120 during its manufacture.

The software applications 234 include a message application 236. The message application 236 can be any suitable software program that allows a user of the mobile device 120 to send and receive electronic messages. Various alternatives exist for the message application 236 as is well known to those skilled in the art. Messages that have been sent or received by the user are typically stored in the flash memory 208 of the mobile device 120 or some other suitable storage element in the mobile device 120. In an alternative embodiment, some of the sent and received messages may be stored remotely from the device 120 such as in a data store of an associated host system that the mobile device 120 communicates with. Mobile device 120 further includes a device state module 240, an address book 242, a Personal Information Manager (PIM) 244, and other modules 246. The device state module 240 provides persistence, i.e. the device state module 240 ensures that important device data is stored in persistent memory, such as the flash memory 208, so that the data is not lost when the mobile device 120 is turned off or loses power. The address book 242 provides information for a list of contacts for the user. For a given contact in the address book, the information can include the name, phone number, work address and email address of the contact, among other information. The other modules 246 may include a configuration module (not shown) as well as other modules that can be used in conjunction with the SIM/RUIM interface 228.

The PIM 244 has functionality for organizing and managing data items of interest to a subscriber, such as, but not limited to, e-mail, calendar events, voice mails, appointments, and task items. A PIM application has the ability to send and receive data items via the wireless network 114. PIM data items may be seamlessly integrated, synchronized, and updated via the wireless network 114 with the mobile device subscriber's corresponding data items stored and/or associated with a host computer system. This functionality creates a mirrored host computer on the mobile device 120 with respect to such items. This can be particularly advantageous when the host computer system is the mobile device subscriber's office computer system.

Additional applications may also be loaded onto the mobile device 120 through at least one of the wireless network 114, the auxiliary I/O subsystem 212, the data port 214, the short-range communications subsystem 222, or any other suitable device subsystem 224. This flexibility in application installation increases the functionality of the mobile device 120 and may provide enhanced on-device functions, communication-related functions, or both. For example, secure communication applications may enable electronic commerce functions and other such financial transactions to be performed using the mobile device 120.

The data port 214 enables a subscriber to set preferences through an external device or software application and extends the capabilities of the mobile device 120 by providing for information or software downloads to the mobile device 120 other than through a wireless communication network. The alternate download path may, for example, be used to load an encryption key onto the mobile device 120 through a direct and thus reliable and trusted connection to provide secure device communication.

The data port 214 can be any suitable port that enables data communication between the mobile device 120 and another computing device. The data port can be a serial or a parallel port. In some instances, the data port 214 can be a USB port that includes data lines for data transfer and a supply line that can provide a charging current to charge the battery 230 of the mobile device 120.

The short-range communications subsystem 222 provides for communication between the mobile device 120 and different systems or devices, without the use of the wireless network 114. For example, the subsystem 222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 204 and input to the main processor 202. The main processor 202 will then process the received signal for output to the display 210 or alternatively to the auxiliary I/O subsystem 212. A subscriber may also compose data items, such as e-mail messages, for example, using the keyboard 216 in conjunction with the display 210 and possibly the auxiliary I/O subsystem 212. The auxiliary subsystem 212 may include devices such as: a touch screen, mouse, track ball, infrared fingerprint detector, or a roller wheel with dynamic button pressing capability. The keyboard 216 is preferably an alphanumeric keyboard and/or telephone-type keypad. However, other types of keyboards may also be used. A composed item may be transmitted over the wireless network 114 through the communication subsystem 204.

For voice communications, the overall operation of the mobile device 120 is substantially similar, except that the received signals are output to the speaker 218, and signals for transmission are generated by the microphone 220. Alternative voice or audio I/O subsystems, such as a voice message recording subsystem, can also be implemented on the mobile device 120. Although voice or audio signal output is accomplished primarily through the speaker 218, the display 210 can also be used to provide additional information such as the identity of a calling party, duration of a voice call, or other voice call related information.

To access or use a service provided by a host service (for example host service 102, 104, 106), a user of the mobile device 120 must log onto a service session with the host service by entering a login and password at the beginning of the session (e.g, when user decides to start using the device and/or service provided by the host service) so that the mobile device 120 and host service can establish a communication link by authenticating the logon credentials entered by the user. During an active session, the device and host service can send and receive messages across the established wireless link.

Before logging off a session on the mobile device, the user is prompted for login credentials (login/password) to authenticate the device for subsequent sessions. The login credentials may be stored locally on the mobile device or at the host service.

Figure 3:
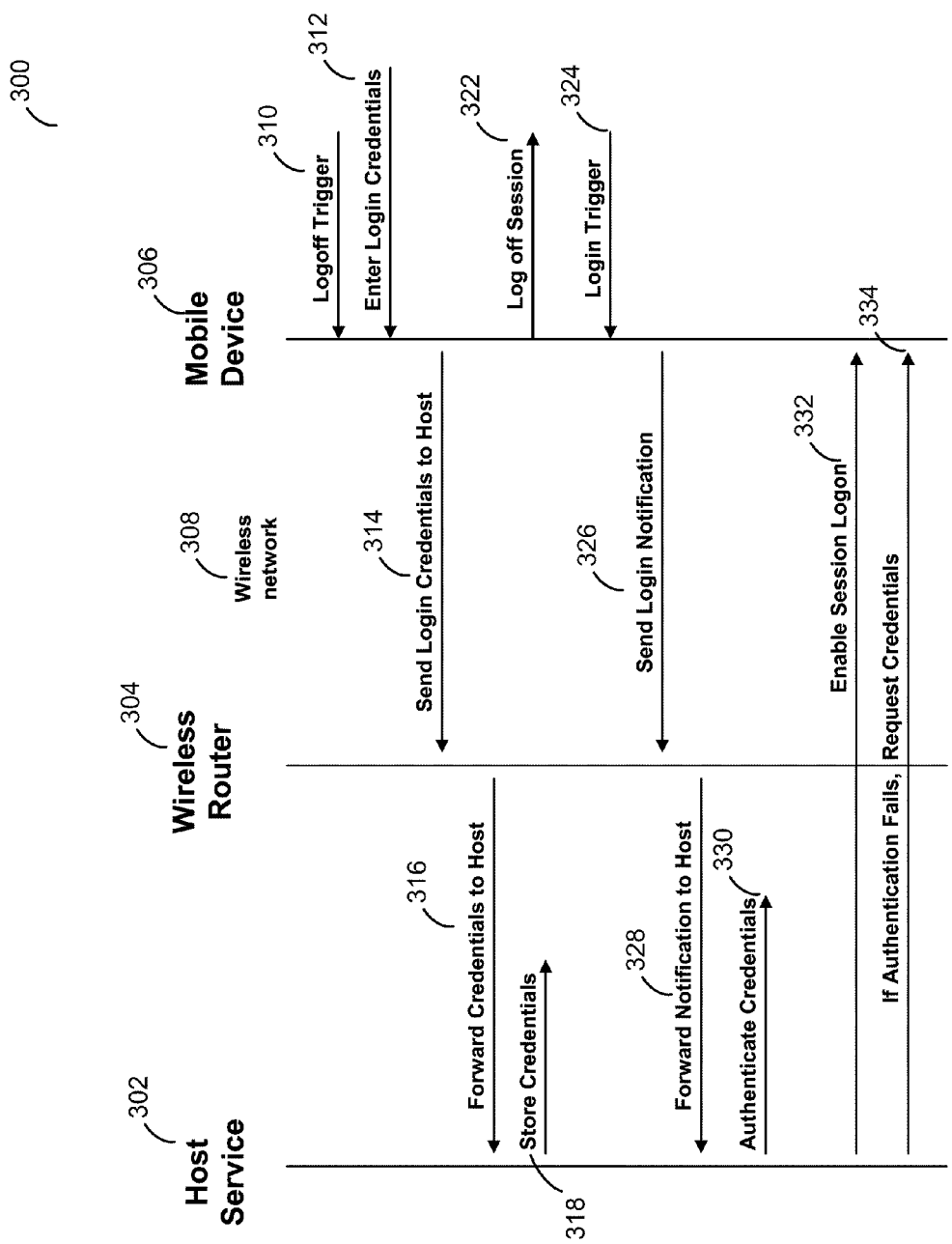
FIG. 3 is an exemplary sequence diagram to illustrate storing login credentials at a host service.

FIG. 3 is an exemplary communication sequence diagram between various components of a wireless communication system 300 in which login credentials are stored at a host service. Communication system 300 comprises of a host service 302, wireless router 304, and a mobile device 306 operating on wireless network 308. Host service 302 is synonymous with host service 102, 104 and 106 of FIG. 1, and is responsible for handling message delivery to and from the mobile device 306. Host service 302 receives e-mail messages from its designated corporate email server, such as Microsoft Exchange™, Lotus Notes™, and/or Novell Groupwise™, and temporarily stores the content on a host service server (not shown). In addition to supporting corporate mail servers, host service 302 may handle public mail services such as Yahoo Mail™, Microsoft Hotmail™, Google GMail™, and the like. Host service 302 may also handle other types of data services and messaging types such as instant messages, web browsing, SMS, MMS and/or voice messages.

When a wireless session is active (i.e., user at mobile device 306 is logged onto a session with host service 302), the user of mobile device 306 is able to send and receive messages to and from host service 302. For example, a message arriving at host service 302 during an active session will be redirected to wireless router 304, and then wirelessly routed across wireless network 308, where the message is received on mobile device 306. One of a plurality of resident programs 234, for example message application 236, then receives the incoming message and displays it for the user to view on mobile device 306.

Once the user of mobile device 306 or mobile device 306 itself initiates a session termination (i.e., log off the session on mobile device 306), a logoff trigger 310 is initiated. Logoff trigger 310 may include such events as powering down the mobile device 306, turning off the device's radio 204, mobile device 306 going out of coverage, or the user manually requesting a log off event. Logoff trigger 310 might also include an inactivity timeout where based on a predefined period of inactivity, the mobile device 306 logs off the session with the host service 302. Logoff trigger 310 may also be an automatic Auto Off event where the mobile device 306 shuts down based on a programmed Auto Off date and/or time. For example, mobile device 306 may be set to power down and log off a session at 11 pm each night when the user retires to bed.

Once mobile device 306 detects a logoff trigger 310, it prompts the user to enter login credentials 312. As stated above, login credentials 312 consist of authentication information that enable a user to log onto a session with host service 302 and may for example include one or a combination of a login and password, a shared public or private key, a secret token and/or a VPN token. Login credentials 312 may be manually entered by the user or may be stored in cache or memory on mobile device 306. In certain embodiments, login credentials 312 may also undergo a redundancy check to ensure that login credentials 312 are correct. Incorrect login credential 312 attempts are dropped until correct values are entered. Other embodiments may not allow the process to proceed until correct set of login credentials 312 are entered.

Once correct login credentials 312 are acquired, login credentials 312 are sent to host service 302 via wireless router 304, at steps 314 and 316. In this embodiment, host service 302 stores the credentials, at step 318, either permanently in memory 208 or temporarily in cache or RAM 206, until login credentials 312 are ready to be used. In addition to sending login credentials 312 to host service 302, at step 314, mobile device 306 also logs off the current session, at step 322.

At step 324, mobile device 306 detects a login trigger. Login trigger 324 can be any event that indicates to mobile device 306 and host service 302 that the user of mobile device 306 would like to initiate a session. For example, login trigger 324 may be one of a plurality of events, including a manual or automatic login to the session, powering on of the mobile device 306, turning on the radio, a keypress on keyboard 216, scrolling activity on a thumbwheel, touch-screen input on a touch-screen display, or releasing the device 306 from a holster or case. A further example of login trigger 324 is a predefined Auto On event where the device is programmed to systematically turn on and initiate a session at a pre-defined time or day. For example, an Auto On event may be to turn mobile device 306 on at 8:00 am on weekdays. Yet a further example of login trigger 324 is when the device 306 returns back to coverage. For example, if the device is out of coverage and returns to coverage, it may wish to inform host service 302 that it is back in coverage and can continue its session or initiate a new one.

Once login trigger 324 is detected, mobile device 306 sends a login notification from the device 306 to the host 302, via wireless router 304, at steps 326 and 328. The login notification informs host service 302 that mobile device 306 is ready to initiate a session. Once host service 302 receives the login notification, it authenticates its stored copy of login credentials 312, at step 330. If the authentication is successful, then a session is enabled, at step 332. The session continues until a further logoff trigger is detected, at step 310.

Furthermore, if the authentication at step 330 fails, host service 302 sends a notification to mobile device 306 to request for further valid credentials, at step 334. At this point, the user will be prompted to enter login credentials, at step 312, where it will be sent to host (steps 314 and 316) for storage (step 318).

The login credentials used for authentication at step 330 are updated and stored frequently. This information is created based on the previous logoff trigger (310) whereupon a revised set of login credentials are forwarded from mobile device 306 to the host service 302 and stored in memory at step 318. Furthermore, both the host service and mobile device have a stored set of valid credentials whereupon the login credentials are used to compare with.

Figure 4A:
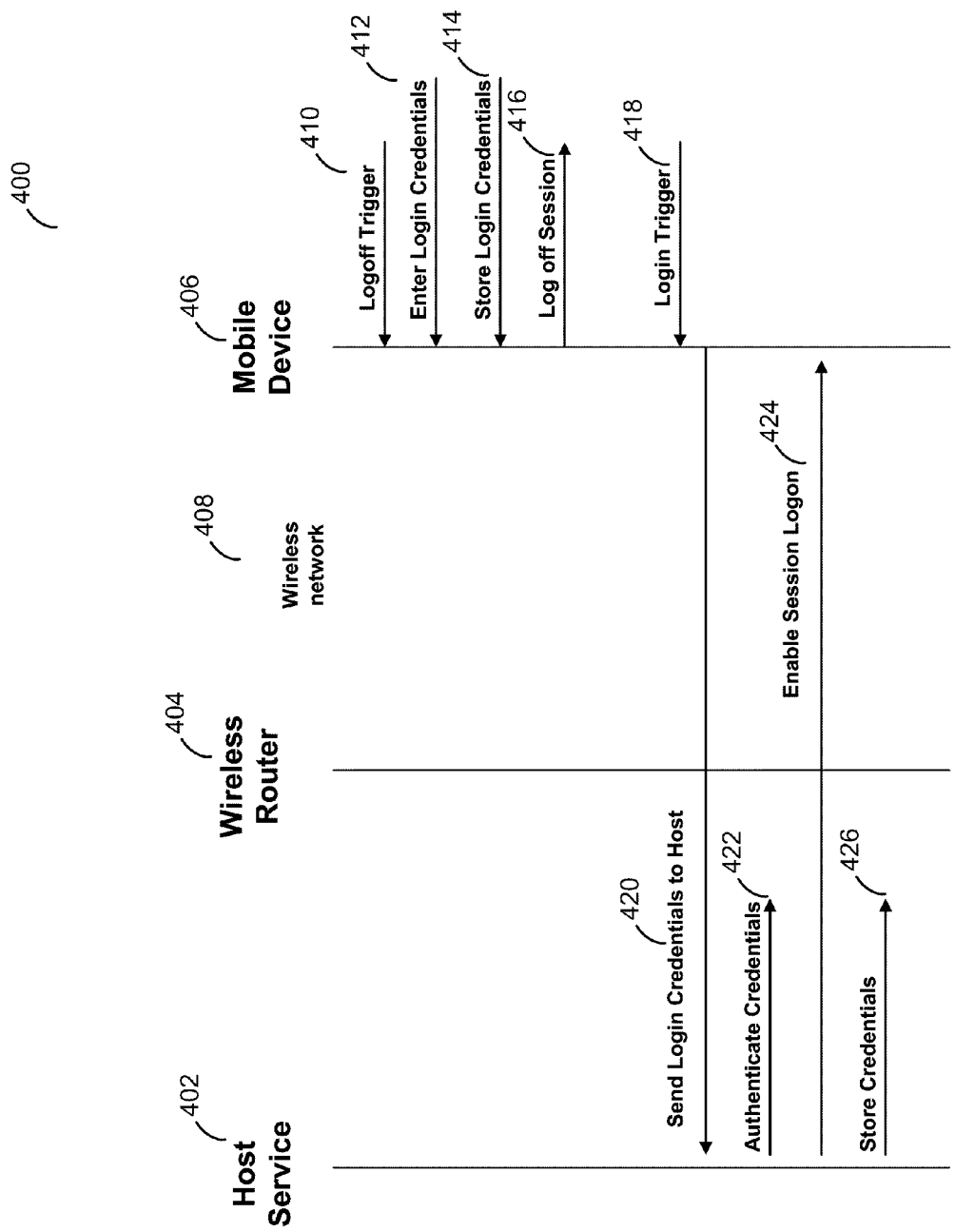
FIG. 4A is an exemplary sequence diagram to illustrate storing login credentials at a mobile device with host-level authentication.

As can be seen, FIG. 3 illustrates storing login credentials 312 at host service 302. Other embodiments may exist to store the login credentials 312 at mobile device 306. Furthermore, login credential authentication may be conducted either at mobile device 306 or at the host service 302. As an example, FIG. 4A is another communication sequence diagram between a host service 402, wireless router 404 and mobile device 406 of a wireless communication system 400 in which login credentials are stored at a mobile device 406 but with host-level authentication.

In this embodiment, the process is also initiated by a logoff trigger, at step 410. Upon receiving this logoff trigger 410, the user is prompted to enter login credentials, at step 412. These credentials are then stored on the device 406 either in long term memory or in cache, at step 414. Mobile device 406 then logs off the session, at step 416.

Mobile device 406 then monitors for a login trigger at step 418. Examples of different login and logoff triggers can be found in the aforementioned description of FIGS. 1-3. Upon detecting a login trigger, mobile device 406 sends the stored login credentials 414 to the host at step 420. Once the login credentials 414 are received at the host service 402, host service 402 authenticates the login credentials 412 sent, at step 422 and, if the authentication is successful, enables a session logon, at step 424. Login credentials are then stored at host service 402 at step 426, awaiting the next logon session. Note that the login credentials used for authentication at step 422 are stored credentials from the previous session (i.e., previous session's step 426).

Figure 4B:
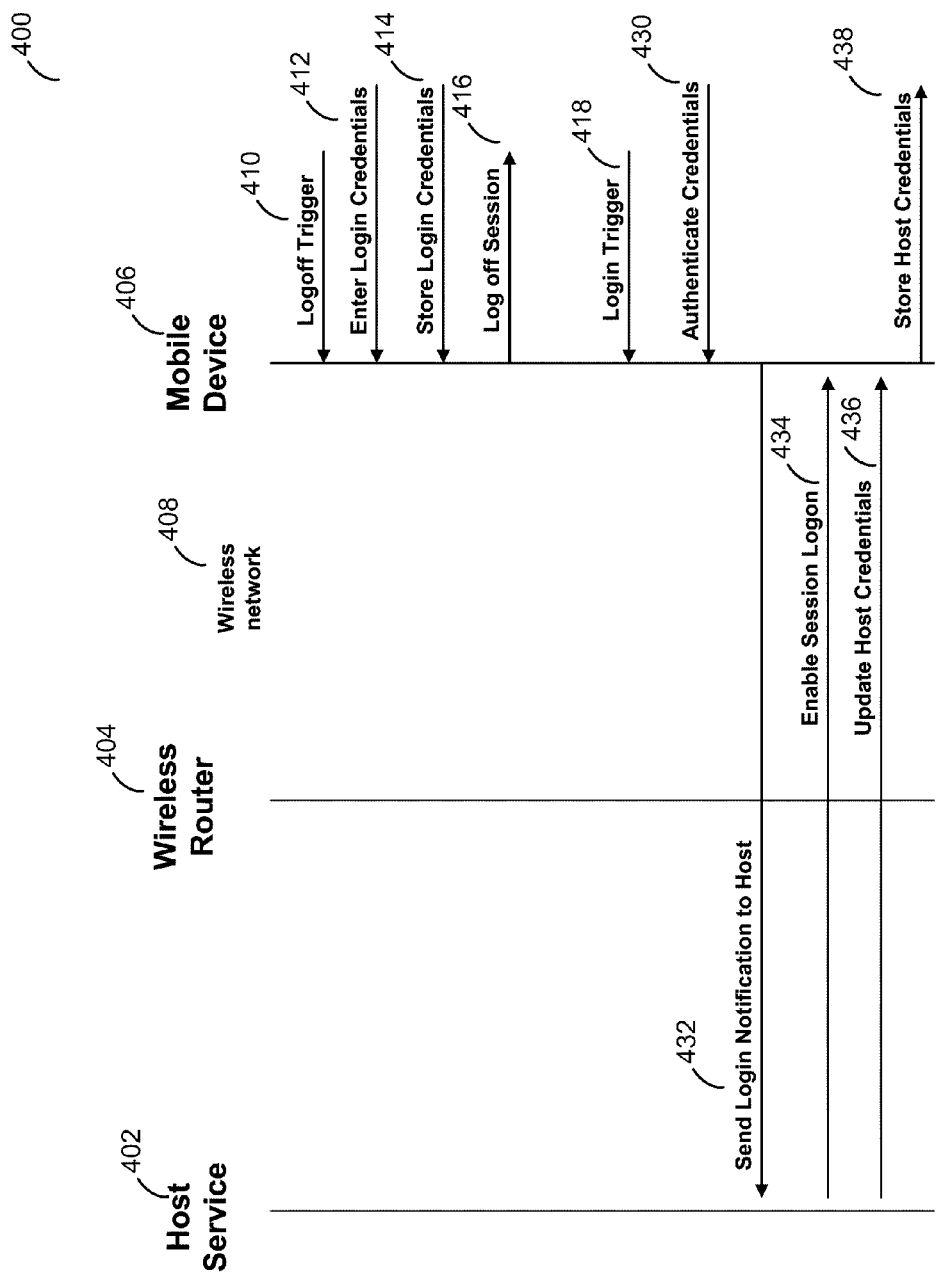
FIG. 4B is an exemplary sequence diagram to illustrate storing login credentials at the mobile device and using device-level authentication.

A further embodiment of communication system 400 encompasses device level-authentication. FIG. 4B is an exemplary sequence diagram illustrating storage of login credentials at the device 406 and using device-level authentication. In this embodiment, after sensing a logoff trigger, at step 410, the user is prompted for login credentials, at step 412. Once entered, login credentials 412 are then stored on mobile device 406, at step 414. Mobile device 406 then logs off the existing session, at step 416.

The next event is the detection of a login trigger, at step 418. Once the login trigger is detected, mobile device 406 authenticates the previously stored credentials 412, at step 430. Upon a successful authentication, mobile device 406 then sends a login notification to host service 402, at step 432 during which the login credentials authenticated by mobile device 406 are also sent. Host service 402 will then initiate a session, at step 434.

Furthermore, host service 402 sends a set of login credentials to mobile device 406 at step 436. The login credentials are then stored at step 438 on mobile device 406. Login credentials are used for the next login authentication at step 430. If the login credentials at step 412 do not match those provided by the host service 402, as provided at steps 436 and 438, a session logon is not permitted until correct login credentials are validated. For example, in this exemplary embodiment, a user enters invalid login credentials (412) before logging off a session (416). During the next login trigger (418), the mobile device authenticates the entered login credentials (412) with the previously stored login credentials (438). If there is a match, an active session is initiated. If there is no match, a user dialog appears indicating invalid authentication has occurred and prompting the user to re-enter login credentials.

Figure 5A:
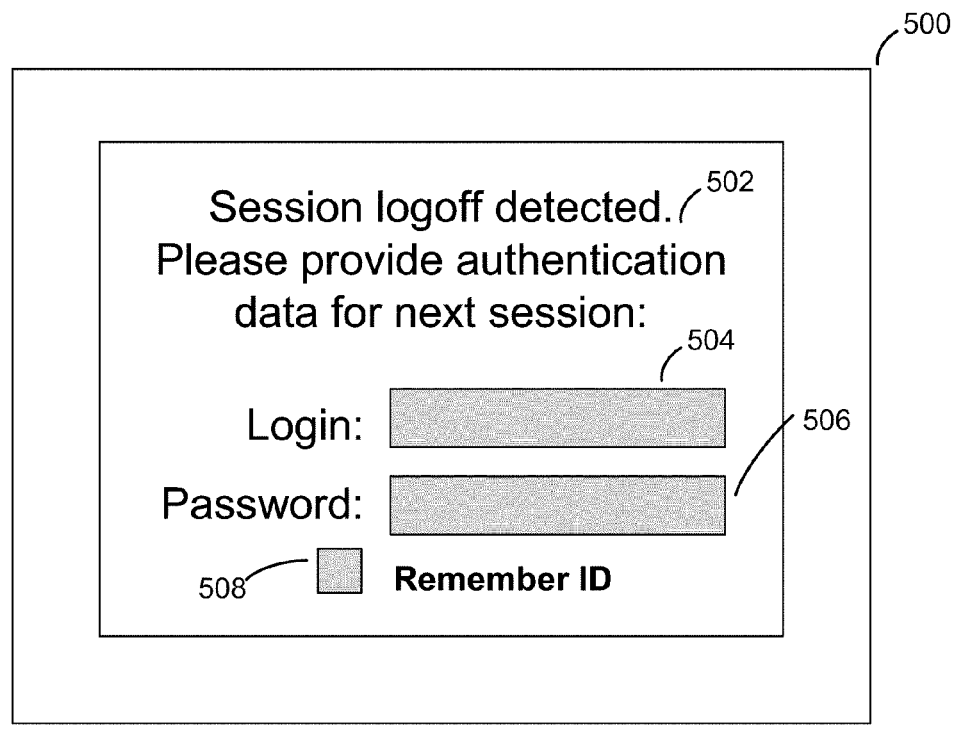
FIG. 5A is block diagram to illustrate an exemplary credentials entry screen.

In the aforementioned embodiments, the user is prompted for login credentials in steps 312 and 412. Login credential may be entered using an entry screen. FIG. 5A is block diagram to illustrate an exemplary credentials entry screen. Entry screen 500 comprises of a message 502, providing instructions or steps to enter the login credentials for a subsequent session. Login credentials components such as the login and password can be entered in a login field 504 and a password field 506. The data entered in these fields can be visible or masked. A further checkbox 508 may be available to store the last entered values in memory. If checkbox 508 is checked, the device will pre-fill login and password fields 504 and 506 with preconfigured values.

Figure 5B:
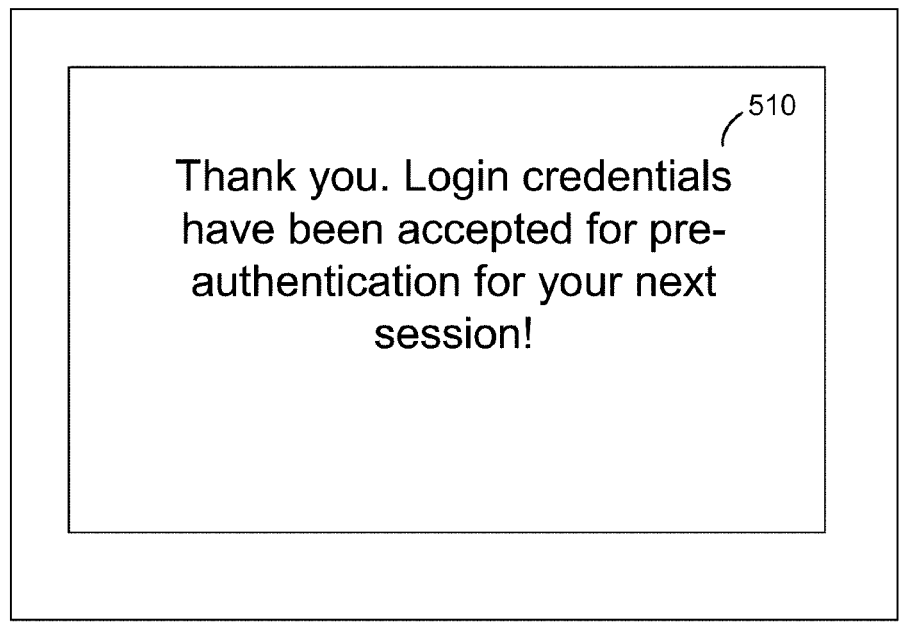
FIG. 5B is block diagram to illustrate an exemplary credentials confirmation dialog.

FIG. 5B is block diagram to illustrate an exemplary credentials confirmation dialog. Once successful login credentials are entered, confirmation dialog box 510 may appear. If the credentials are incorrect, a further dialog box (not shown) may appear indicating an incorrect entry and prompting the user to re-enter login credentials at entry screen 500.

Figure 6:
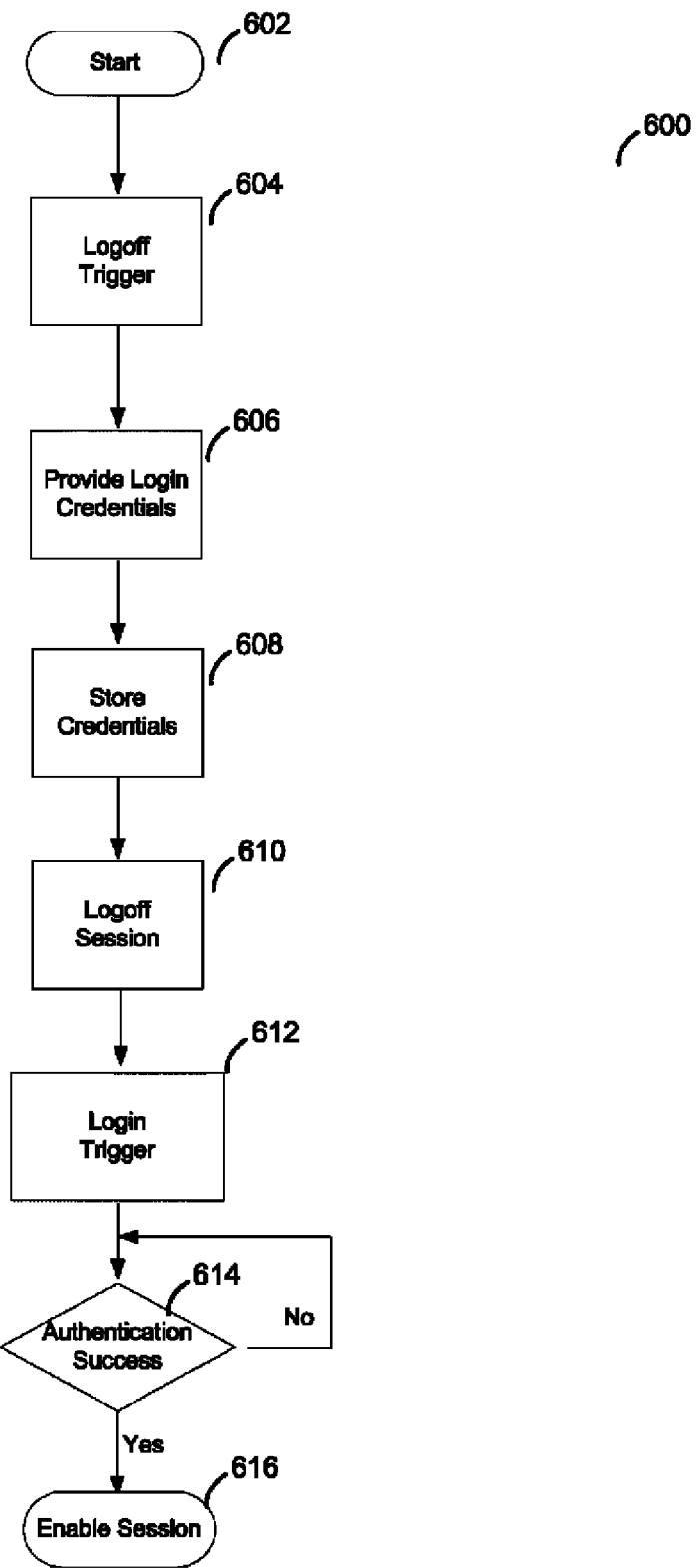
FIG. 6 is an exemplary flow diagram illustrating a process for authenticating login credentials.

FIG. 6 is an exemplary flow diagram illustrating a process 600 for authenticating login credentials. Login authentication process 600 begins at step 602 by first detecting a logoff trigger at step 604. When a logoff trigger is detected, the user is prompted to provide login credentials at step 606. These credentials are then stored in cache or memory on a mobile device (such as devices 120, 122, 124 on FIG. 1) or at a host service (such as host services 102, 104, 106 on FIG. 1) at step 608.

Mobile device then logs off the current session at step 610. The process does not continue until a login trigger is detected at step 612. Upon detecting a login trigger, the mobile device or host service would authenticate the session logon at step 614. If the authentication is successful, then a session is enabled at step 616. However, if the authentication fails, the process loops back to step 614 until a successful authentication is detected at step 614. A successful authentication occurs when there is a match between the recently inputted login credentials (608) with a set of previously stored login credentials, at either the host service or mobile device, that has been used to successfully enable a session logon for a previous session. The process concludes at step 616 with a success session logon where the user can communicate between the host service and mobile device to send and receive messages.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless mobile device for use in enabling service sessions with a host service via a wireless network, the wireless mobile device including a user input/output (I/O) subsystem having at least a display, the method comprising the steps of:

receiving at least one host login credential from the host service, and saving the at least one host login credential in memory of the wireless mobile device;

detecting, at the wireless mobile device, a logoff trigger for logging off from an enabled service session with the host service;

in response to detecting the logoff trigger, the wireless mobile device performing the following acts:

prompting with, in the display, an entry screen having at least one field for entry of at least one device login credential for use in logging on to a subsequent service session with the host service;

receiving, via the user I/O subsystem, the at least one device login credential in response to the prompting, and saving the at least one device login credential in the memory;

after receiving and saving the at least one device login credential, logging off from the enabled service session with the host service;

after the logging off from the enabled service session, detecting, at the wireless mobile device, a login trigger for logging on to the subsequent service session with the host service;

in response to detecting the login trigger, authenticating, at the wireless mobile device, the at least one device login credential saved in the memory with the at least one saved host login credential saved in the memory.

2. The method of claim 1, wherein the enabled service session is utilized for a communication of data messages between the host service and the wireless mobile device via the wireless network, and the subsequent service session is utilized for a subsequent communication of data messages between the host service and the wireless mobile device via the wireless network.

3. The method of claim 1, further comprising:
after authenticating, sending via the wireless network a login notification to the host service.

4. The method of claim 1, further comprising:
after authenticating, communicating in the subsequent service session.

5. The method of claim 1, further comprising:
after authenticating, receiving via the wireless network at least one updated host login credential from the host service, and storing the at least one updated host login credential for a subsequent authentication.

6. The method of claim 1 wherein for the enabled and subsequent service sessions utilized for the communication of data messages, the host service is configured to receive the data messages for the wireless mobile device from other devices and cause them to be synchronized with and mirror those at the wireless mobile device.

7. The method of claim 1, wherein the logoff trigger is a user-initiated logoff trigger.

8. The method of claim 1 wherein the at least one device login credential includes at least one of a login, password, a shared public, a private key, a secret token and a virtual private network (VPN) token.

9. The method of claim 1 wherein the at least one login credential comprises a password.

10. The method of claim 1 wherein the wireless mobile device and the wireless network are operative in accordance with IEEE 802.11.

11. The method of claim 1 wherein the wireless mobile device comprises a cellular telephone, and the wireless mobile device and the wireless network are operative in accordance with cellular telecommunication standards.

12. A wireless mobile device, comprising:
a processor;
memory coupled to the processor;
a wireless transceiver coupled to the processor and configured for communication with a wireless communication network;
a user input/output (I/O) subsystem having at least a display;
the processor being configured to:
receive, via the wireless transceiver, at least one host login credential from the host service, and save the at least one host login credential in the memory;
detect a logoff trigger for logging off from an enabled service session with the host service;
in response to detecting the logoff trigger, perform the following actions:
prompt with, in the display, an entry screen having at least one field for entry of at least one device login credential for use in logging on to a subsequent service session with the host service;
receive, via the user I/O subsystem, the at least one device login credential in response to the prompting, and save the at least one device login credential in the memory;
after receiving and saving the at least one device login credential, log off from the enabled service session with the host service;
after the logging off from the enabled service session, detect a login trigger for logging on to the subsequent service session with the host service;
in response to detecting the login trigger, authenticate the at least one device login credential saved in the memory with the at least one saved host login credential saved in the memory.

13. The wireless mobile device of claim 12, wherein the enabled service session is utilized for a communication of data messages between the host service and the wireless mobile device via the wireless network, and the subsequent service session is utilized for a subsequent communication of data messages between the host service and the wireless mobile device via the wireless network.

14. The wireless mobile device of claim 12, wherein the processor is further configured to:
after authenticating, send via the wireless transceiver a login notification to the host service.

15. The wireless mobile device of claim 12, wherein the processor is further configured to:
after authenticating, operate the wireless transceiver for communications in the subsequent service session with the host service.

16. The wireless mobile device of claim 12, wherein the processor is further configured to:
after authenticating, receive via the wireless transceiver at least one updated host login credential from the host service, and store the at least one updated host login credential for a subsequent authentication.

17. The wireless mobile device of claim 12, wherein the processor is further configured to:
wherein for the enabled and subsequent service sessions utilized for the communication of data messages, the host service is configured to receive the data messages for the wireless mobile device from other devices and cause them to be synchronized with and mirror those at the wireless mobile device.

18. The wireless mobile device of claim 12, wherein the logoff trigger is a user-initiated logoff trigger.

19. The wireless mobile device of claim 12, wherein the at least one device login credential includes at least one of a login, password, a shared public, a private key, a secret token and a virtual private network (VPN) token.

20. The wireless mobile device of claim 12, wherein the at least one login credential comprises a password.

\* \* \* \* \*